(12) United States Patent
Dai

(10) Patent No.: US 8,401,303 B2
(45) Date of Patent: Mar. 19, 2013

(54) METHOD AND APPARATUS FOR IDENTIFYING CHARACTER AREAS IN A DOCUMENT IMAGE

(75) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 12/962,377

(22) Filed: Dec. 7, 2010

(65) Prior Publication Data

US 2011/0158517 A1    Jun. 30, 2011

(30) Foreign Application Priority Data

Dec. 28, 2009  (JP) ................. 2009-298822

(51) Int. Cl.
G06K 9/00 (2006.01)
G06K 9/46 (2006.01)
G06K 9/50 (2006.01)

(52) U.S. Cl. ......... 382/195; 382/190; 382/199; 382/165

(58) Field of Classification Search .................. None
See application file for complete search history.

(56) References Cited

U.S. PATENT DOCUMENTS

| 5,208,869 | A * | 5/1993 | Holt ............... 382/138 |
| 5,872,864 | A * | 2/1999 | Imade et al. ........... 382/176 |
| 6,873,436 | B1 | 3/2005 | Terada et al. |
| 2007/0189615 | A1 * | 8/2007 | Liu et al. ........... 382/232 |
| 2007/0257939 | A1 * | 11/2007 | Fan ............... 345/636 |
| 2009/0274374 | A1 * | 11/2009 | Hirohata et al. ....... 382/218 |
| 2010/0260417 | A1 | 10/2010 | Dai |
| 2011/0058744 | A1 * | 3/2011 | Kan ............... 382/190 |
| 2011/0157424 | A1 * | 6/2011 | Makino et al. .......... 348/231.99 |

FOREIGN PATENT DOCUMENTS

| JP | 7-264397 A | 10/1995 |
| JP | 09-269970 A | 10/1997 |
| JP | 2002-142128 A | 5/2002 |
| JP | 2002-279345 A | 9/2002 |

OTHER PUBLICATIONS

U.S. Appl. No. 12/962,325, filed Dec. 7, 2010, Applicant: Xiaoyan Dai.

* cited by examiner

*Primary Examiner* — Li Liu
(74) *Attorney, Agent, or Firm* — Fitzpatrick, Cella, Harper & Scinto

(57) ABSTRACT

An image processing apparatus comprises an attribute determination unit that divides image data into a plurality of blocks each having a predetermined number of pixels and determines an attribute of each of the divided blocks that indicates whether or not the block includes a character; a connected area extraction unit that extracts a connected area in which pixels having the same pixel characteristic are connected sequentially, from each of the divided blocks; and a foreground/background determination unit that selects a foreground/background determination method to be used for a processing target block, based on the attribute of the processing target block, the attribute of a first adjacent block that is adjacent to the processing target block, and the extracted connected areas, and determines whether a connected area of the processing target block among the extracted connected areas is the foreground or the background, using the selected foreground/background determination method.

13 Claims, 14 Drawing Sheets

FIG. 7

| ATTRIBUTE OF LEFT BLOCK | ATTRIBUTE OF TARGET BLOCK | FOREGROUND OF LEFT BLOCK IS PRESENT ON BOUNDARY? | SURROUNDING RELATION IS ESTABLISHED BETWEEN CONNECTED AREAS OF TARGET BLOCK? | | FOREGROUND / BACKGROUND DETERMINATION METHOD FOR TARGET BLOCK |
|---|---|---|---|---|---|
| NON-CHARACTER | CHARACTER | — | YES | B | DETERMINATION BASED ON SURROUNDING RELATION OF CONNECTED AREAS |
| | | | NO | C | DETERMINATION BASED ON SIMILARITY IN BACKGROUND COLOR |
| CHARACTER | CHARACTER | YES | — | A | DETERMINATION BASED ON CONNECTION RELATION BETWEEN FOREGROUND CONNECTED AREAS |
| | | NO | YES | B | DETERMINATION BASED ON SURROUNDING RELATION OF CONNECTED AREAS |
| | | | NO | C | DETERMINATION BASED ON SIMILARITY IN BACKGROUND COLOR |

WHITE BACKGROUND :
FIRSTLY APPEARING COLOR

GRAY BACKGROUND :
SECONDLY APPEARING COLOR

AREA HAVING TWO BACKGROUND COLORS

EXAMPLE OF CHARACTER AREA
INCLUDING AREA HAVING TWO BACKGROUND COLORS

FOREGROUND-INTEGRATED BLOCK 1
(INTEGRATED BLOCK 1)

FOREGROUND-INTEGRATED BLOCK 2
(INTEGRATED BLOCK 2)

BLOCK 1

METHOD AND APPARATUS FOR IDENTIFYING CHARACTER AREAS IN A DOCUMENT IMAGE

BACKGROUND OF THE INVENTION

1. Field of the Invention

The present invention relates to an image processing apparatus, an image processing method, and a computer-readable medium. More specifically, the invention relates to an image processing apparatus that identifies character portions of a document that includes character areas such as where inverse characters and non-inverse characters coexist and where background portions are not uniform.

2. Description of the Related Art

In recent years, there have been increasing opportunities to optically read a document image with a scanner or the like, convert the read image into electronic document data, and store or print the document data or recognize characters in the document data. In this case, it is necessary to perform processing such as switching image processing in order to improve print image quality, or generating pixel attribute information and character-portion identification information from read image data in order to improve the recognition rate of characters.

Specifically, it is determined whether each pixel included in a document image is a background pixel or a character pixel. For background pixels, it is further determined whether the pixel is a halftone dot pixel or a base pixel. For character pixels, attribute information indicating, for example, whether the pixel is a character pixel surrounded by halftone dot pixels or a character pixel surrounded by base pixels, is further generated. For improved image quality, it is critical to switch image processing adaptively according to such pixel attributes. Meanwhile, in order to identify and reuse as many characters as possible, it is important to precisely identify even those characters such as inverse characters (what are called "knockout characters") and characters whose background or character portions are not uniform, as character portions.

Inverse characters are used as a method for highlighting portions to be especially enhanced in the case of rendering a document image. One example of such is shown in FIG. 1A. In this example, an area 1-1 is a heading area including inverse characters, an area 1-2 is a heading area in which inverse characters and non-inverse characters coexist, and an area 1-3 is a highlighted character area in the body. Background or character portions of character areas, together with use of different colors instead of the same color, are used as a method of enhancing the contents of a document image. For example, an area 1-4 is an example of a character area whose background portion is not uniform (the left-side background color of the area 1-4 is white, the right-side background color is gray, and characters having the same color are described with those background colors).

Conventionally, several methods have been proposed for detecting a character area including inverse characters. As an example, there is a method for separating a document image into areas such as characters, photographs, graphics, and tables, cutting out and converting each area determined as a character into binary form on a character-by-character basis, and determining whether or not each character is an inverse character based on the distribution of the number of white pixels and the number of black pixels within a circumscribed rectangle of the character (see Japanese Patent Laid-Open No. 09-269970). There is also a method in which a document image is converted into binary form, white background pixels and black foreground pixels are separated from one another, connected components of the foreground pixels are extracted, and circumscribed rectangles of connected areas are obtained. Then, an area whose circumscribed rectangle has a high aspect ratio is determined as a candidate for inverse character areas, and whether or not the area is an inverse character area is determined depending on the proportion of the number of white background pixels to the number of black foreground pixels within the area (see Japanese Patent Laid-Open No. 2002-279345). Meanwhile, there is also a method for dividing an image into blocks and determining whether or not each block is a character portion. More specifically, an image is converted into binary form for each block, a representative value of white pixels and a representative value of black pixels are obtained, and character and background portions of blocks are determined based on differences in the representative values of white and black pixels between the blocks (see Japanese Patent Laid-Open No. 07-264397).

However, there are the following problems with the conventional technology described above. With the method described in Japanese Patent Laid-Open No. 09-269970, after a document image is separated into areas, character areas are cut out for each character, circumscribed rectangles of characters are obtained, and characters whose circumscribed rectangles include a greater number of black pixels than the number of white pixels are determined as inverse characters based on the assumption that ordinary characters have a smaller number of black character pixels than the number of white surrounding background pixels. However, in the example of cutting out complicated inverse characters such as shown in the left-side diagram of FIG. 1B, the number of black background pixels is smaller than the number of white character pixels and accordingly errors occur during determination of character portions, such as the character portions not being determined as inverse characters.

With the method described in Japanese Patent Laid-Open No. 2002-279345, a heading having a high aspect ratio in a document image, that is, a rectangular heading, is determined as a candidate for inverse characters, and it is further determined whether or not such a heading includes an inverse character. However, since a heading area is not always rectangle, a nearly square-shaped heading such as that shown by the area 1-1 in FIG. 1A cannot be determined as inverse characters with the method described in Japanese Patent Laid-Open No. 2002-279345. Moreover, an inverse character area is determined based on the numbers of black and white pixels as in the case of Japanese Patent Laid-Open No. 09-269970, and therefore errors also occur during determination of character portions in complicated inverse character areas. In addition, as described in the methods of Japanese Patent Laid-Open Nos. 09-269970 and 2002-279345, separating a document image into areas and further determining whether or not each area is an inverse character takes much processing time and requires a large work memory.

With the method described in Japanese Patent Laid-Open No. 07-264397, processing cost can be reduced because a document image is divided into blocks and character identification processing is performed on a block-by-block basis. However, in the character identification processing, differences in the representative values of white and black pixels between blocks are obtained, and it is determined that pixel groups having small differences in the representative values are background portions, and pixel groups having large differences in the representative values are character portions. Accordingly, errors occur during determination of character portions in character areas, such as the area 1-4 shown in FIG. 1A, whose background color changes significantly but whose character portions change very little. In addition, in the case where non-inverse character blocks and inverse character blocks are adjacent to one another such as shown in the right-side diagram of FIG. 1B, if black character portions of the non-inverse character blocks are determined as characters, black background portions of the right-side inverse character blocks will be determined as characters. On the contrary, if white character portions of the inverse character blocks are determined as characters, white background portions of the non-inverse characters blocks will be determined as characters.

Image processing to be performed on character portions and background portions differs greatly. For example, characters in the base background are subjected to edge enhancement processing, and black character portions are subjected color processing in which the base is removed to obtain a single black color, whereas a halftone-dot background is subjected to smoothing processing. From this, if character portions are incorrectly determined as the background or if background portions are incorrectly determined as characters, the required image processing cannot be performed and accordingly image quality is reduced. Meanwhile, OCR is generally designed to recognize either black pixels or white pixels in a binary image as elements constituting characters, and therefore will have a limited range of character recognition if character portions cannot be determined.

SUMMARY OF THE INVENTION

The present invention achieves high quality image processing and recognition of as many characters as possible by dividing a document image into blocks and determining the attribute of each block. Specifically, an image processing method and an image processing apparatus are provided that acquire connected areas of blocks, select a determination method for determining whether each connected area of a block is a character portion or the background based on a change in attribute between adjacent blocks, and make a determination using the selected method.

According to one aspect of the present invention, there is provided an image processing apparatus comprising: an attribute determination unit that divides image data into a plurality of blocks each having a predetermined number of pixels and determines an attribute of each of the divided blocks that indicates whether or not the block includes a character; a connected area extraction unit that extracts a connected area in which pixels having the same pixel characteristic are connected sequentially, from each of the divided blocks; and a foreground/background determination unit that selects a foreground/background determination method to be used for a processing target block, based on the attribute of the processing target block, the attribute of a first adjacent block that is adjacent to the processing target block, and the extracted connected areas, and determines whether a connected area of the processing target block among the extracted connected areas is the foreground or the background, using the selected foreground/background determination method.

According to another aspect of the present invention, there is provided an image processing method comprising: an attribute determination step of dividing image data into a plurality of blocks each having a predetermined number of pixels, and determining an attribute of each of the divided blocks that indicates whether or not the block includes a character; a connected area extraction step of extracting a connected area in which pixels having the same pixel characteristic are connected sequentially, from each of the divided blocks; and a foreground/background determination step of selecting a foreground/background determination method to be used for a processing target block, based on the attribute of the processing target block, the attribute of a first adjacent block that is adjacent to the processing target block, and the extracted connected areas and determining whether a connected area of the processing target block among the extracted connected areas is a foreground or a background, using the selected foreground/background determination method.

According to the present invention, the attributes of blocks each having a predetermined number of pixels are determined, connected areas of the blocks are extracted, a foreground (character)/background determination method is switched in accordance with determination results indicating the attributes of adjacent blocks, and it is determined whether or not each connected area of a block is the foreground or the background. This enables recognition of character portions in those areas including inverse character areas, character areas in which inverse characters and non-inverse characters coexist, and character areas whose background colors or character colors are not uniform. In addition, image processing can be performed with high precision by identifying the attributes of the identified character portions and the background portions based on foreground/background determination results. It is also possible, by connecting the identified character portions with reference to surrounding blocks and performing character recognition, to enlarge a processing target for character recognition. Moreover, determining character portions on a block-by-block basis enables improvement in processing efficiency.

Further features of the present invention will become apparent from the following description of exemplary embodiments with reference to the attached drawings.

BRIEF DESCRIPTION OF THE DRAWINGS

FIG. 7 is a diagram illustrating switching of the foreground/background determination methods according to the first embodiment.

DESCRIPTION OF THE EMBODIMENTS

The following is a detailed description of processing for determining character portions, using an image processing apparatus according to the present invention with reference to the drawings. However, constituent elements described in these embodiments are merely described by way of example, and the technical scope of the present invention is determined by the claims of the present invention and is not intended to be limited by the following individual embodiments.

In addition, although Japanese documents are shown as examples in FIGS. 1A, 1B, 5, 6A, 6B, 9A, and 9B, the present invention is not intended to be limited to Japanese Hiragana and Kanji characters and may be applied to other language characters such as alphabetic characters.

First Embodiment

Configuration of Apparatus

Figure 1A:
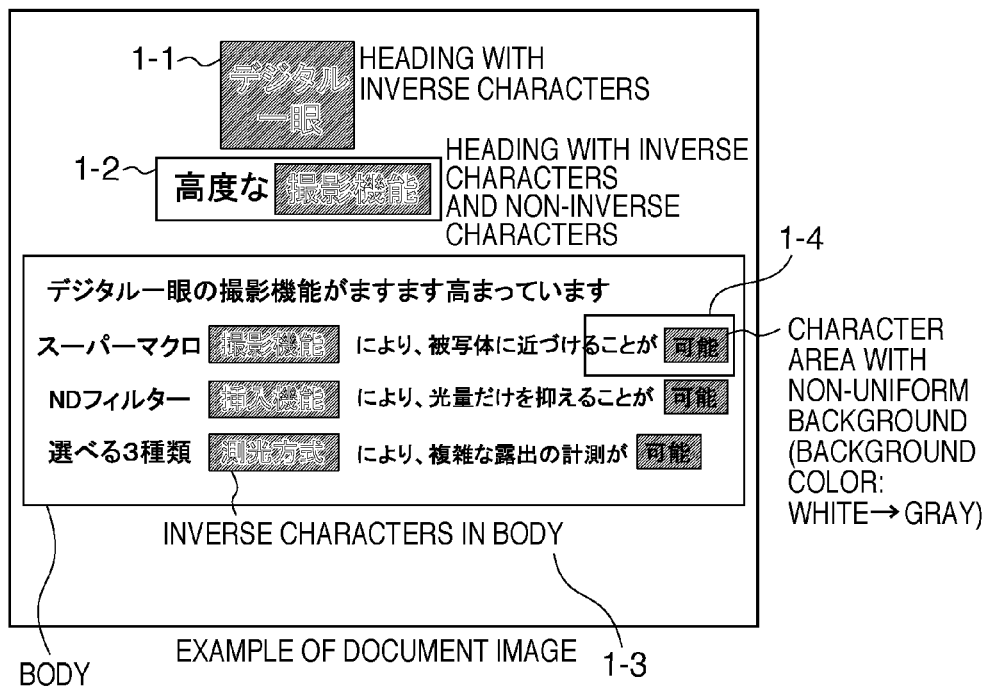
FIGS. 1A and 1B are diagrams illustrating issues to be solved by the present invention.
Figure 1B:
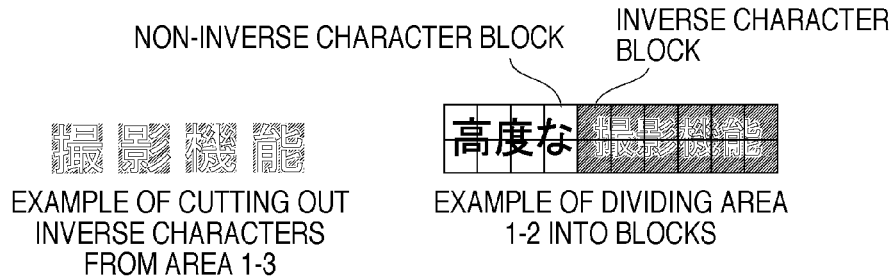
Figure 2:
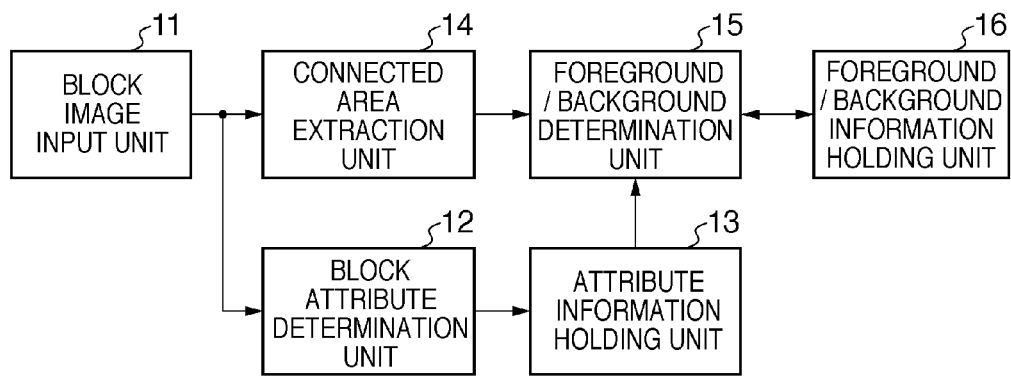
FIG. 2 is a block diagram showing a functional configuration of an image processing apparatus according to a first embodiment.

FIG. 2 is a block diagram showing a configuration of an image processing apparatus according to embodiments of the present invention. In FIG. 2, a block image input unit 11 receives, for example, a monochrome or color image that has been input from paper information via image reading unit such as a scanner, as image data to be processed in units of blocks each having a predetermined number of pixels. In other words, the block image input unit 11 divides an input image into a grid of blocks each having a predetermined number of pixels and inputs images of the divided blocks in order. A block attribute determination unit 12 determines whether or not a target block is a character area including a character, and assigns attribute information to the blocks. An attribute information holding unit 13 holds the attribute of the target block and the attributes of adjacent blocks. A connected area extraction unit 14 extracts each connected area of pixels of the target block. A foreground/background determination unit 15 determines foreground portions (so-called character portions) and background portions of the target block. A foreground/background information holding unit 16 holds a connected area of the target block determined as the foreground, a foreground color thereof, a connected area thereof determined as the background, and a background color thereof and feeds the information back to the foreground/background determination unit 15.

Outline of Foreground/Background Determination Processing

Figure 3:
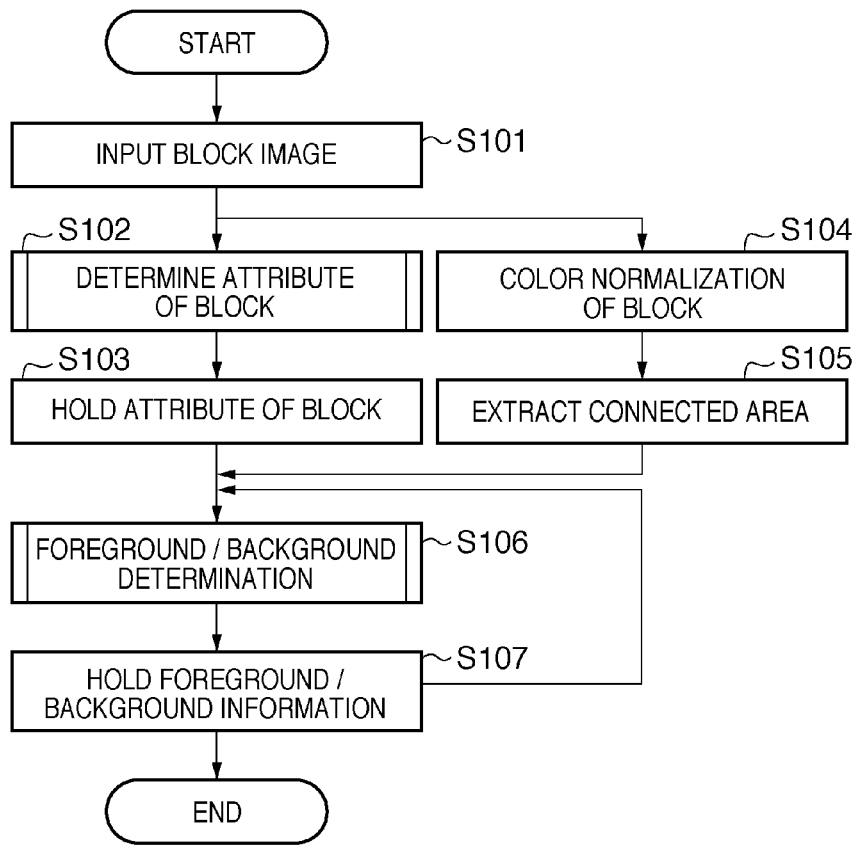
FIG. 3 is a flowchart of foreground/background determination processing according to the first embodiment.

FIG. 3 is a flowchart illustrating the outline of processing for determining the foreground and background of a block according to a first embodiment. First, the block image input unit 11 receives an input of image data of a block constituting an image targeted for processing and having a predetermined number of pixels (step S101). Next, the block attribute determination unit 12 determines whether the block input in the previous step (S101) is a character area that includes a character or a non-character area that includes no character (step S102). The details of this attribute determination processing will be described later. Then, the attribute information holding unit 13 stores the attribute of a processing target block and the attribute of the left-side block of the processing target block based on determination results obtained in the previous step (S102) (step S103). Also, the connected area extraction unit 14 performs subtractive color processing on the block input in the previous step (S101), obtains representative colors, and performs quantization on each pixel so that each pixel has the closest representative color (step S104). Then, connected area extraction processing is performed for extracting a cluster of pixels that are connected as having the same color (step S105). Color quantization performed on a multi-value image in step S104 may be binarization, or subtraction of colors into multiple colors with use of a method such as described in Japanese Patent Laid-Open No. 2002-142128, for example. Also, the processing of step S105 for extracting a connected area may be performed using known labeling processing. An example of the connected area extraction processing will be described later.

Next, the foreground/background determination unit 15 determines whether each connected area of the processing target block is the foreground or the background, by referencing the attribute of the processing target block, the attribute of the left-side block, and the information regarding connected areas, which are held in the previous steps (S103 and S105) (step S106). The foreground/background determination method, an example of the foreground/background determination method, and the details of the foreground/background determination processing will be described later. Then, the foreground/background information holding unit 16 holds a foreground connected area, a foreground color, a background connected area, and a background color based on determination results obtained in the previous step (S106) (step S107). The information held at this time will be referenced as necessary in the foreground/background determination processing (step S106).

Attribute Determination Processing (S102)

Figure 4:
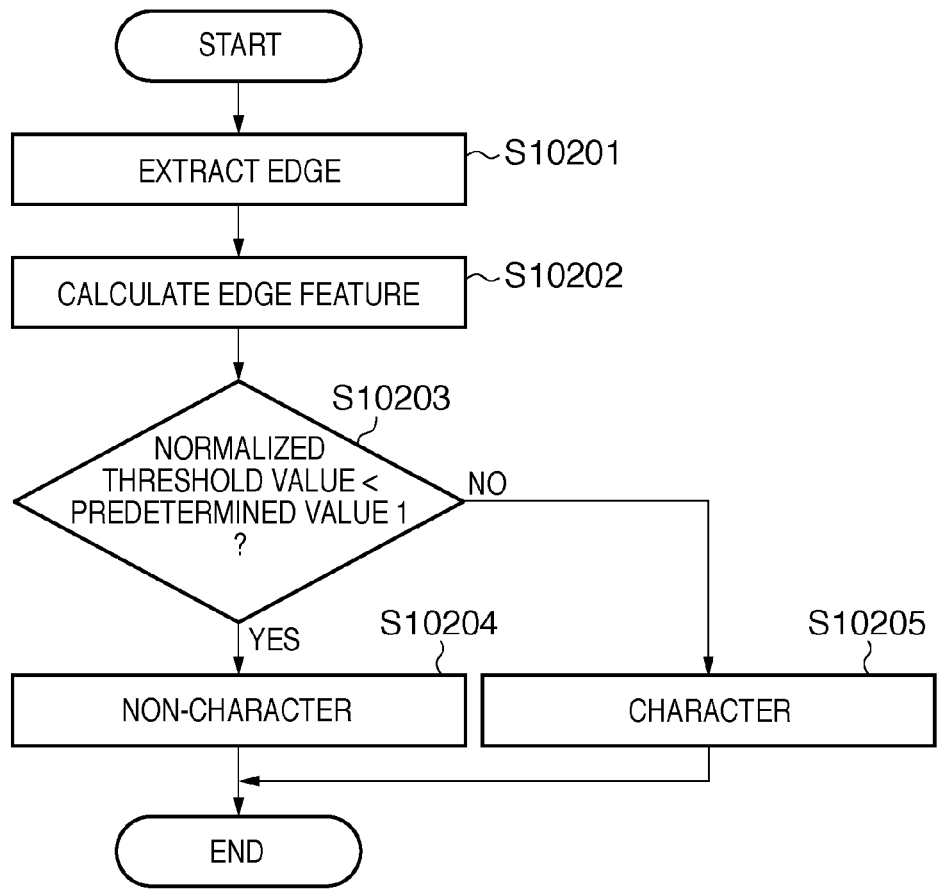
FIG. 4 is a flowchart of block attribute determination processing according to the first embodiment.

The details of the block attribute determination processing (step S102) will be described with reference to FIG. 4. First, an edge is extracted from the input block in step S10201. Edge extraction is processing for generating differential data indicating the edge intensity, and it can be performed using a known filter such as a Prewitte filter or a Sobel filter. Then, a normalized threshold value T that is necessary to determine the attribute of a block is calculated from the extracted edge in step S10202. Assuming min and max, respectively, to be minimum and maximum values of the edge intensity of pixels in a block, a typical normalized range of the edge intensity to be from 0 to 255, and F to be a binarization threshold value, the corresponding normalized threshold value T can be obtained from the following expressions.

$$\max \leq 255 \ T = F$$

$$\max > 255 \ T = \min + (\max - \min) \times F / 255 \quad (1)$$

The normalized threshold value T indicates whether or not the edge intensity of the block is high, and the use of the normalized threshold value T enables differentiation of the attribute of the block. To be specific, a high normalized threshold value will be obtained for a block that includes a character because a character portion with high edge intensity is included in the block. On the other hand, a low normalized threshold value will be obtained for a block that includes no character because the block includes no portion with high edge intensity. Through processing from steps S10203 to S10205, the attribute of the block is determined based on the normalized threshold value. In step S10203, the normalized threshold value of the block is compared with a "predetermined value 1", and if the normalized threshold value is less than the predetermined value 1, the attribute of the block is determined as not being a character in step S10204. If the normalized threshold value is greater than or equal to the predetermined value 1, the attribute of the block is determined as a character in step S10205. Here, the predetermined value 1 is set to a low value (e.g., 250) among possible values that the normalized threshold value can take.

Connected Area Extraction Processing (S105)

Figure 5:
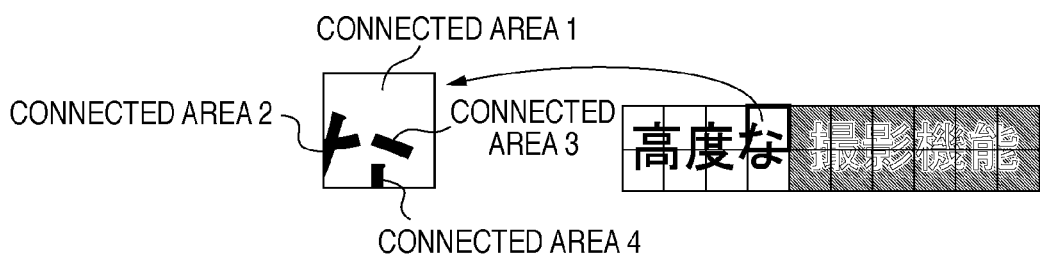
FIG. 5 is a diagram showing an example of connected areas extracted from a block according to the first embodiment.

FIG. 5 is a diagram showing an example of processing for extracting a connected area of a block in image processing according to the first embodiment. One of blocks divided as shown on the right side of FIG. 5 has two colors, white and black, as a result of color quantization performed on character blocks as shown on the left side of FIG. 5. A connected area 1 is a cluster of pixels that are connected as having a white color, and connected areas 2, 3, and 4 are clusters of pixels that are connected as having a black color. That is, the term "connected area" as used herein refers to a group of continuous pixels having the same pixel characteristics such as the same color information.

Foreground background Determination Processing (S106)

If the processing target block is a non-character area, the block as a unit is determined as the background and the color of the block is determined as a background color, without performing foreground/background determination processing. However, if the processing target block is a character area, switching of foreground/background determination methods is performed by referencing the attribute of the left-side block. This processing applies to those character areas including areas that include general characters, areas in which inverse character portions and non-inverse character portions coexist, areas whose background colors are not uniform, and areas whose foreground colors are not uniform. In other words, determination methods using three different criteria, namely a connection relation A between character (foreground) connected areas, a surrounding relation B of connected areas, and similarity C in background color, are switched based on continuity of character portions and a surrounding relation between background portions and character portions. Thereafter, foreground/background determination processing is performed.

Figure 6A:
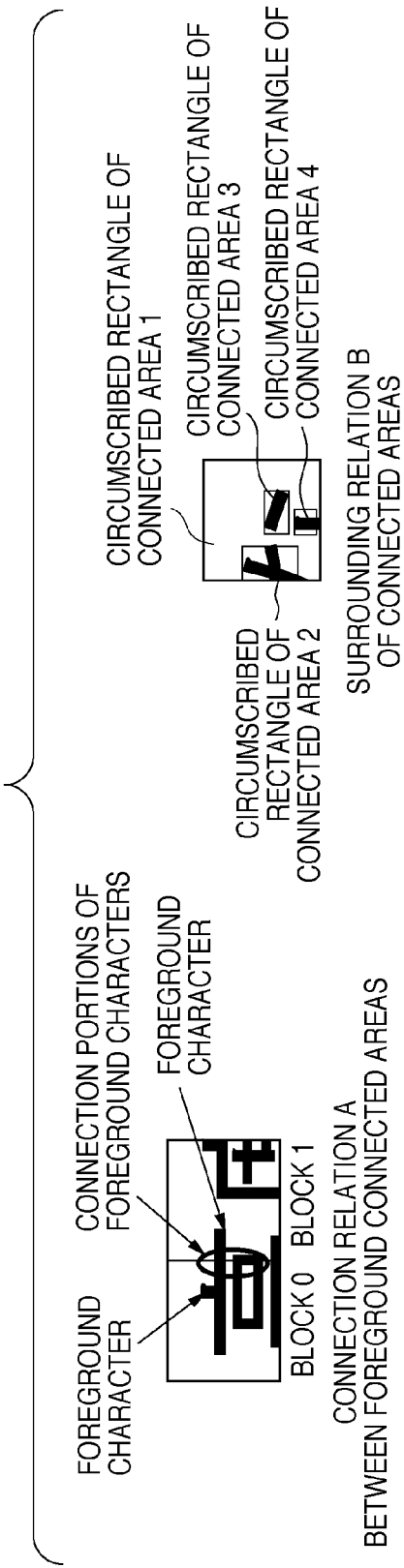
FIGS. 6A and 6B are diagrams illustrating a foreground/background determination method according to the first embodiment.

The following is a description of the three foreground/background determination methods with reference to FIG. 6A. With the method based on the connection relation A between foreground connected areas, the color of a connected area of a processing target block that is connected to a foreground portion of the left-side block is determined as a foreground color, and a connected area of the processing target block that has the foreground color is determined as a foreground portion. Then, a color of the processing target block that is different from the foreground color is determined as a background color, and a connected area of the processing target block that has the background color is determined as a background portion. In the example shown in the left diagram of FIG. 6A, foreground areas of a left-side block 0 of a target block 1 are present on the boundary between the block 1 and the block 0, and therefore connected portions of the block 1 that are connected to those foreground portions, enclosed by a circle, are determined as the foreground. In other words, connected area determination is performed depending on the presence or absence of a connection relation between connected areas of a certain block and its adjacent block.

With the method based on the surrounding relation B of connected areas, a circumscribed rectangle of each connected area of a processing target block is obtained. Then, the color of a connected area that includes (surrounds) another connected area is determined as a background color, and a connected area having the background color is determined as a background portion. On the other hand, a connected area having a color other than the background color is determined as a foreground portion. In the example shown in the right diagram of FIG. 6A, circumscribed rectangles of four connected areas of a character block are indicated by square frames, and the circumscribed rectangle of a connected area 1 surrounds the other connected areas 2, 3, and 4, so a portion corresponding to the connected area 1 is determined as the background. In other words, connected-area foreground/background determination is performed depending on the presence or absence of a circumscribed rectangle of a certain connected area that includes a circumscribed rectangle of another connected area.

With the method based on the similarity C in background color, block color quantization results are used for a processing target block in which no surrounding relation of connected areas is established. That is, a color of a processing target block that is closest to the background color that was already determined by preceding processing is determined and updated as a new background color, and a connected area of the processing target block that has the updated background color is determined as a background portion. Then, a connected area having a color different from the background color is determined as a foreground portion.

Next is a description of a method for selecting a foreground/background determination method with reference to FIG. 7. In the case where the left-side block of a processing target block is not a character, if a surrounding relation is established between connected areas of the processing target block, the foreground and background of the processing target block are determined based on the surrounding relation B of connected areas, whereas, if no surrounding relation is established, the foreground and background of the processing target block are determined based on the similarity C to the already determined background color. In the case where the left-side block of a processing target block is a character, if an already determined foreground portion of the left-side block is present on the boundary between the processing target block and the left-side block (that is, a connection relation is established between the processing target block and the left-side block), the foreground and background of the processing target block are determined based on the connection relation A between foreground connected areas. In the case where no already determined foreground portion of the left-side block is present on the boundary with the processing target block, if a surrounding relation is established between connected areas of the processing target block, the foreground and background of the processing target block are determined based on the surrounding relation B between connected areas, whereas, if no surrounding relation is established, the foreground and background of the processing target block are determined based on the similarity C to the already determined background color. Note that, for the case where the left-side block is not a character and a processing target block is a character, determination as to the presence of a foreground area on the boundary (that is, determination as to the presence of a connection relation) is indicated by "-" in FIG. 7. This is because the attribute of the left-side block not being a character indicates that there is no foreground in the left-side block, and accordingly it is obvious that no connection relation is established.

Example of Foreground/Background Determination Processing (S106)

Figure 6B:
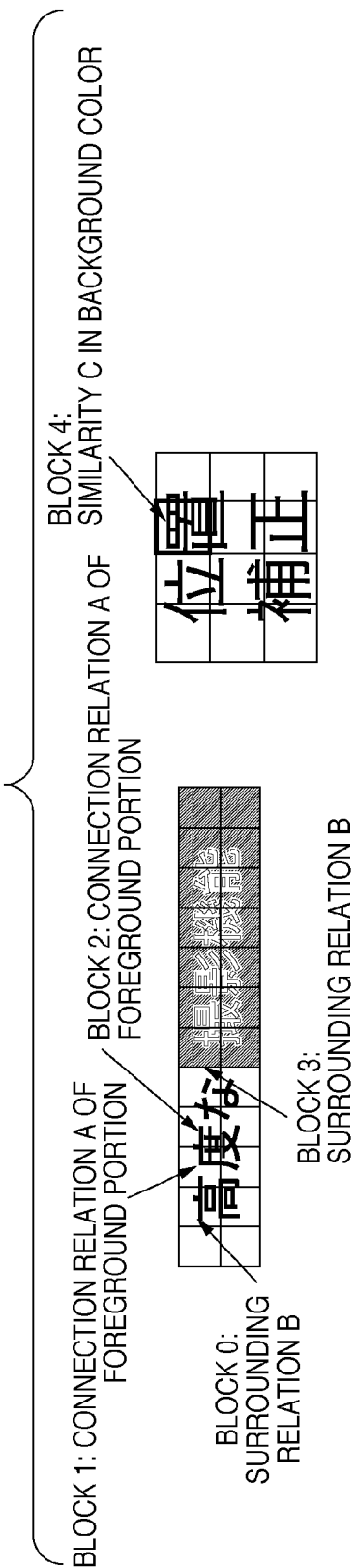

FIG. 6B is a diagram showing specific examples corresponding to the foreground/background determination methods used in image processing according to the first embodiment. Referring to the left-side diagram of FIG. 6B, in the case where a block 0 is to be processed, the foreground and background of the block 0 are determined based on the surrounding relation B of connected areas because the left-side block of the block 0 is not a character and a surrounding relation is established between connected areas of the block 0. In the case where a block 1 is to be processed, the foreground and background of the block 1 are determined based on the connection relation A between foreground connected areas because the left-side block 0 of the block 1 is a character and a foreground portion of the block 0 is present on the boundary between the block 1 and the block 0. In the case where a block 3 is to be processed, the foreground and background of the block 3 are determined based on the surrounding relation B of connected areas because the left-side block is a character and, although no foreground portion of the left-side block is present on the boundary between the block 3 and the left-side block, a surrounding relation of connected areas of the block 2 is established. Also, in the example of adjacent character areas shown in the right-side diagram of FIG. 6B, for example in the case where a block 4 is to be processed, the foreground and background of the block 4 are determined based on the similarity C in background color because no surrounding relation is established between connected areas of the block 4 under the conditions defined in FIG. 7.

Foreground/Background Determination Processing (S106)

Figure 8A:
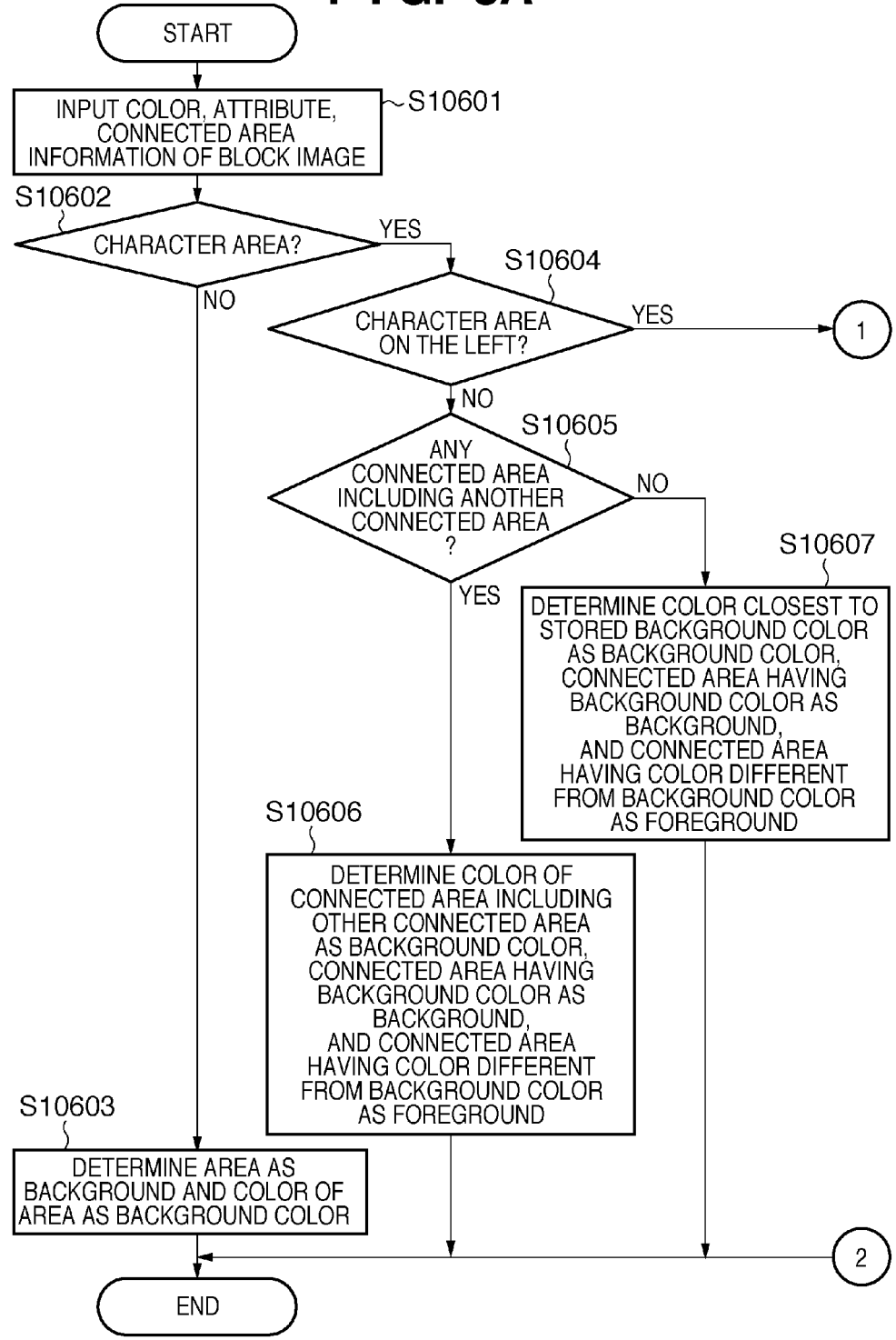
FIGS. 8A and 8B are flowcharts of foreground/background determination processing according to the first embodiment.
Figure 8B:
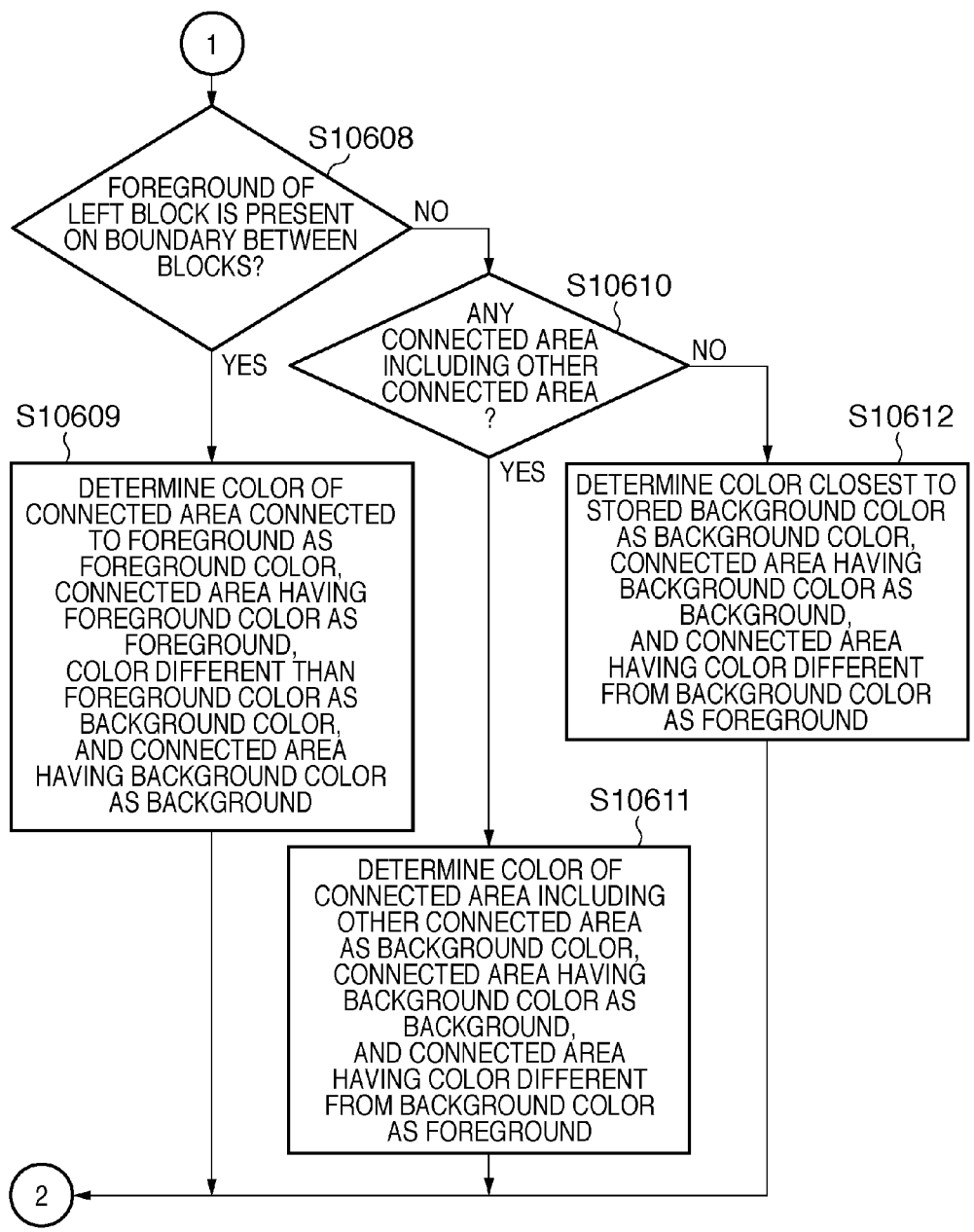

Now, the foreground/background determination processing will be described with reference to FIGS. 8A and 8B. First, attribute information, color quantization information, and connected area information are input in step S10601. Then, it is determined in step S10602 whether or not a processing target block is a character area. If the processing target block is not a character area, the procedure proceeds to step S10603, in which the processing target block is determined as the background and the color of the processing target block is determined as a background color. If the processing target block is a character area, the procedure proceeds to step S10604, in which the attribute of the left-side block is referenced so as to switch the foreground/background determination methods. In step S10604, it is determined whether or not the attribute of the left-side block is a character area. If the attribute of the left-side block is not a character, the procedure proceeds to step S10605. In step S10605, it is determined whether or not a surrounding relation is established between connected areas of the processing target block. If a surrounding relation is established, the procedure proceeds to step S10606, in which the color of a connected area that includes (surrounds) another connected area is determined as a background color, and a connected area having the background color is determined as a background portion. On the other hand, a connected area that has a color different from the background color is determined as a foreground portion. If no surrounding relation is established, the procedure proceeds to step S10607, in which a color of the processing target block that is closest to the already determined background color is determined as a background color, and a connected area of the processing target block that has the background color is determined as a background portion. Then, a connected area of the processing target block that has a color different from the background color is determined as a foreground portion. In other words, in step S10607, a connected area of the processing target block that has a color similar to the already determined background color of the left-side block is determined as the background, and a connected area of the processing target block that has a color dissimilar to the background color of the left-side block is determined as the foreground.

If it has been determined in step S10604 that the left-side block is a character, the procedure proceeds to step S10608. In step S10608, it is determined whether or not any already determined foreground portion of the left-side block is present on the boundary with the processing target block. If such a foreground portion is present on the boundary, the procedure proceeds to step S10609, in which the color of a connected area of the processing target block that is connected to the already determined foreground portion of the left-side block is determined as a foreground color, and a connected area of the processing target block that has the foreground color is determined as a foreground portion. On the other hand, a color of the processing target block that is different from the foreground color is determined as a background color, and a connected area of the processing target block that has the background color is determined as a background portion. If it has been determined in step S10608 that no such foreground portion is present on the boundary, the procedure proceeds to step S10610, in which it is determined whether or not a surrounding relation is established between connected areas of the processing target block. If a surrounding relation is established in step S10610, the procedure proceeds to step S10611, in which the color of a connected area that includes another connected area is determined as a background color, and a connected area having the background color is determined as a background portion. Then, a connected area having a color different from the background color is determined as a foreground portion. If no surrounding relation is established in step S10610, the procedure proceeds to step S10612, in which a color of the processing target block that is closest to the already determined background color is determined as a background color, a connected area having the background color is determined as a background portion, and a connected area having a color different from the background color is determined as a foreground portion.

Note that steps S10606 and S10611 are the same processing, and steps S10607 and S10612 are the same processing.

As described above, in the first embodiment, the foreground/background determination processing to be processed is switched by referencing the attribute of a processing target block and the attribute of the left-side block. According to the present embodiment, the foreground and background of not only general character areas but also those character areas including areas in which inverse character portions and non-inverse character portions coexist and areas whose background or foreground colors are not uniform can be determined with high precision at low processing cost. Although an example in which the foreground and background of a block are determined by referencing information as to the attribute of the left-side block and information as to connection of connected areas between left and right blocks has been described in the present embodiment, information to be referenced may be information as to the attribute of the upper-side block and information as to connection of connected areas between upper and lower blocks, or may be information as to a plurality of blocks. Even in such cases, similar effects can be achieved. In addition, although a case in which the attribute of a block is determined based on a normalized threshold value calculated from maximum and minimum values of the edge intensity has been described, other methods may be used to determine a normalized threshold value, or other attribute determination methods may be used. Moreover, although the attribute of a block is determined using a criterion of whether or not the block is a character, a more detailed criterion may be used at the beginning of determination, such as "whether the block is a base area, a halftone-dot area, a character on base area, or a character on halftone-dot area". Then, data may be organized into two parts, a character area and a non-character area.

Second Embodiment

Figure 9A:
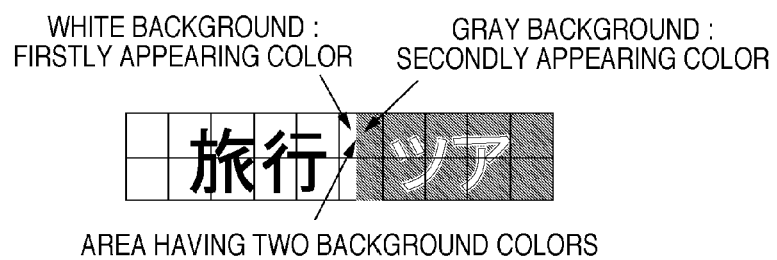
FIGS. 9A and 9B are diagrams showing an example of a character area including a two-color background area according to second and fourth embodiments.
Figure 10:
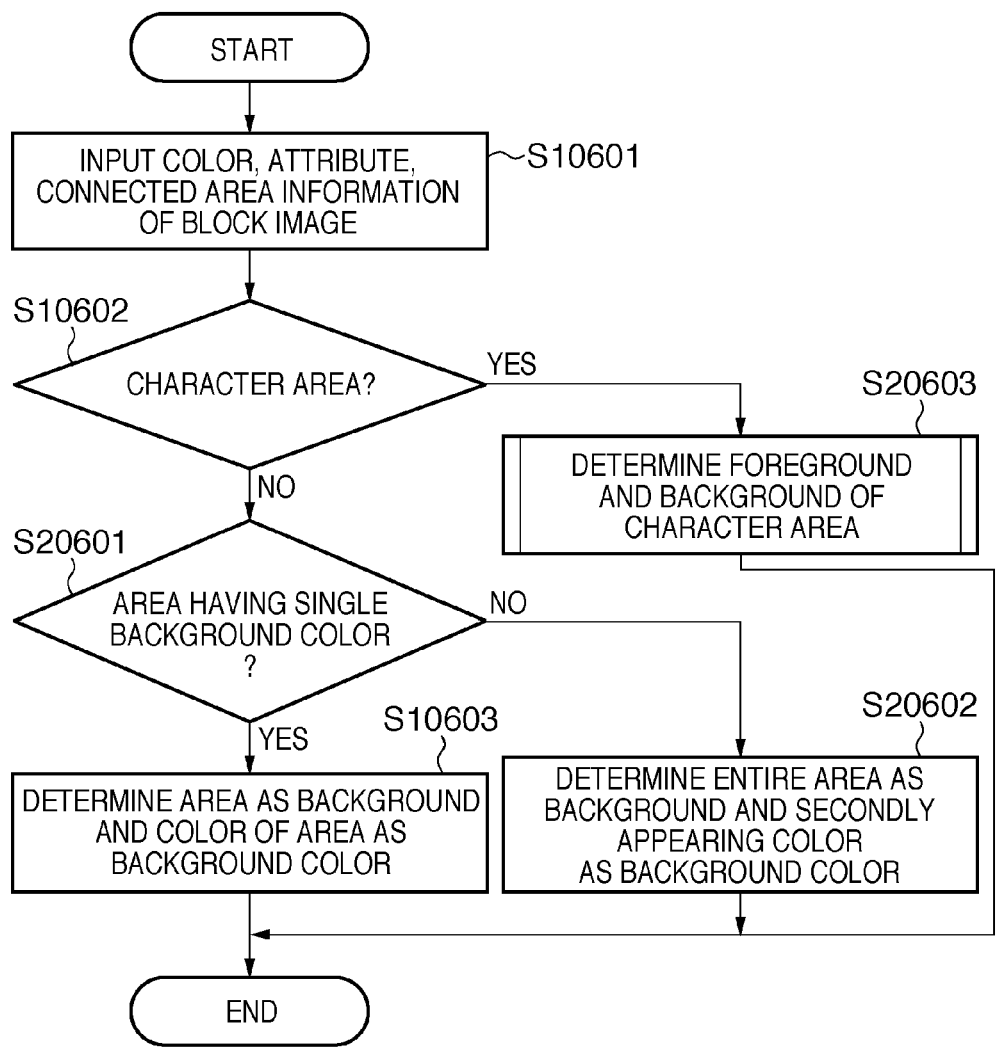
FIG. 10 is a flowchart of foreground/background determination processing according to the second embodiment.

In the first embodiment described previously, it is assumed that a block determined as not being a character is constituted by only pixels having a single background color. The present embodiment is directed to a foreground/background determination method that is also applicable to a case where a non-character block has two background colors such as shown in FIG. 9A. The following is a description of such foreground/background determination processing with reference to FIG. 10. Note that this processing corresponds to step S106 of FIG. 3, and therefore descriptions of the other process steps have been omitted since it is the same as the first embodiment.

First, attribute information, color quantization information, and connected area information are input in step S10601. Then, it is determined in step S10602 whether or not a processing target block is a character area. If the processing target block is a character area, the procedure proceeds to step S20603, in which the foreground/background determination processing from steps S10604 to S10612 described in the first embodiment is performed. If it has been determined in step S10602 that the processing target block is not a character area, the procedure proceeds to step S20601. In step S20601, it is determined whether or not the processing target block has color information for only a single color. If the processing target block has color information for only a single color, the procedure proceeds to step S10603, in which the processing target block is determined as a background area, and the background color is updated. If it has been determined in step S20601 that the processing target block has color information for more than single colors, the procedure proceeds to step S20602. Then, all connected areas of the block, that is, the block as a whole is determined as a background area, and a secondly appearing color or the color of a connected area that abuts either the right-side block or the lower-side block is held as a background color. The background color held at this time will be used for the case where that right-side block becomes a processing target block and the procedure of the foreground/background determination processing proceeds to step S10607. Assuming that the left-side block or the upper-side block is a first adjacent block, the right-side block or the lower-side block is referred to as a second adjacent block.

According to the embodiment described above, the foreground and background of a block can be determined with high precision even if the block is an area having two background colors.

Third Embodiment

Figure 11:
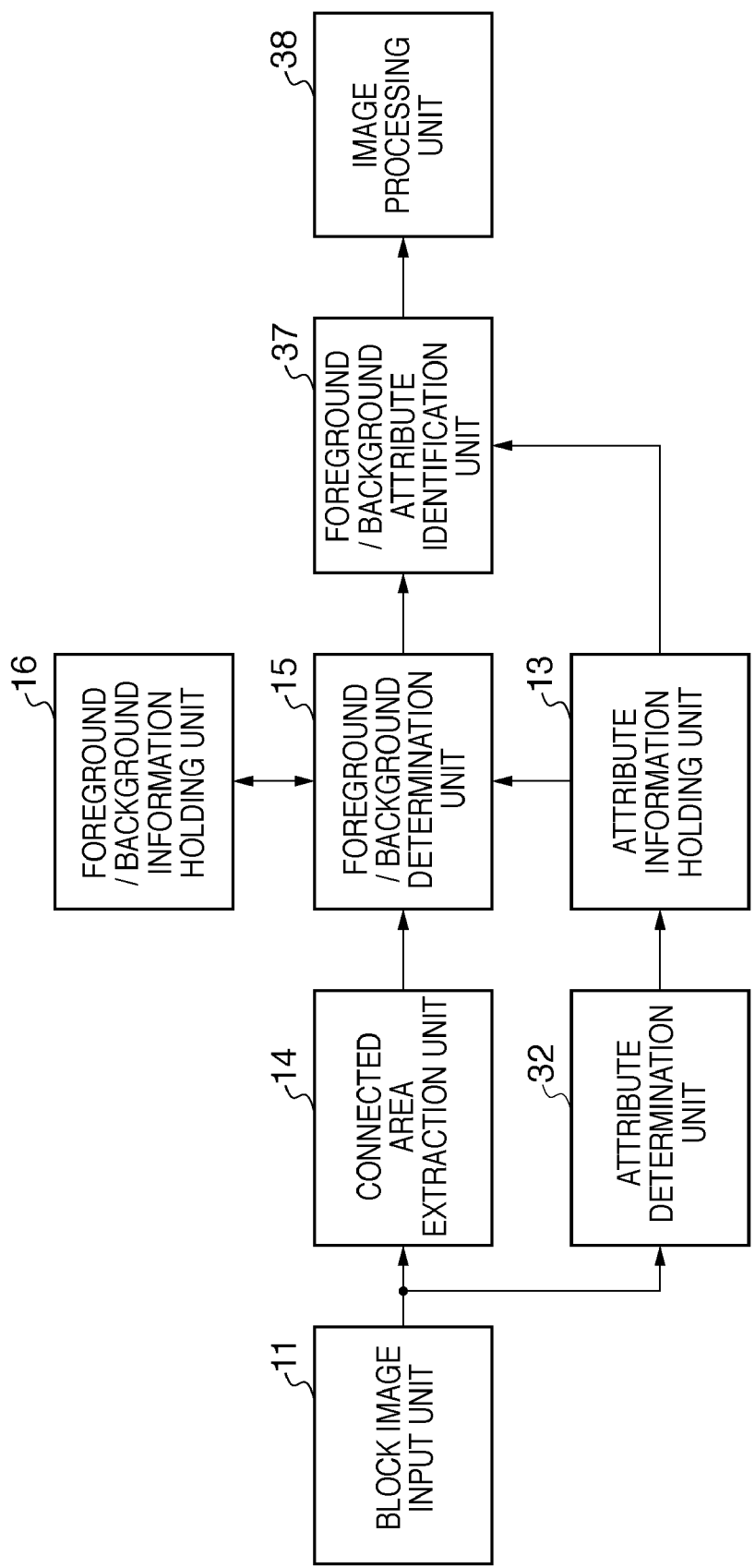
FIG. 11 is a block diagram showing a functional configuration of an image processing apparatus according to a third embodiment.

The foreground/background determination processing has been described in the first and second embodiments described above. The present embodiment provides an application example of the foreground/background determination processing with addition of foreground/background attribute identification processing and image processing. FIG. 11 is a block diagram showing a configuration of an image processing apparatus according to the present embodiment. The attribute determination unit 12 of FIG. 2 for determining whether or not the block is a character area is replaced with an attribute determination unit 32 for making a more detailed attribute classification. Further, a foreground/background attribute identification unit 37 and an image processing unit 38 are added to the configuration of FIG. 2.

The attribute determination unit 32 determines attribute information required for image processing, that is, whether the block is a base area, a halftone-dot area, a character on base area, or a character on halftone-dot area. The details of this attribute determination processing will be described later. The foreground/background attribute identification unit 37 identifies the attribute of each foreground or background portion based on the block attribute information determined by the attribute determination unit 32 and the foreground or background portion determined by the foreground/background determination unit 15 (step S308). The details of this foreground/background attribute identification processing will be described later. The image processing unit 38 switches image processing based on the attribute of each pixel. Because each connected area is a cluster of pixels having the same attribute, image processing is performed depending on the attribute of each connected area of pixels and whether each connected area of pixels is the foreground or the background. Examples of such image processing include edge enhancement processing to be performed on character portions in the base background, color processing to be performed on black character portions in which the base is removed to obtain a single black color, and smoothing processing to be performed on the halftone-dot background.

Figure 12:
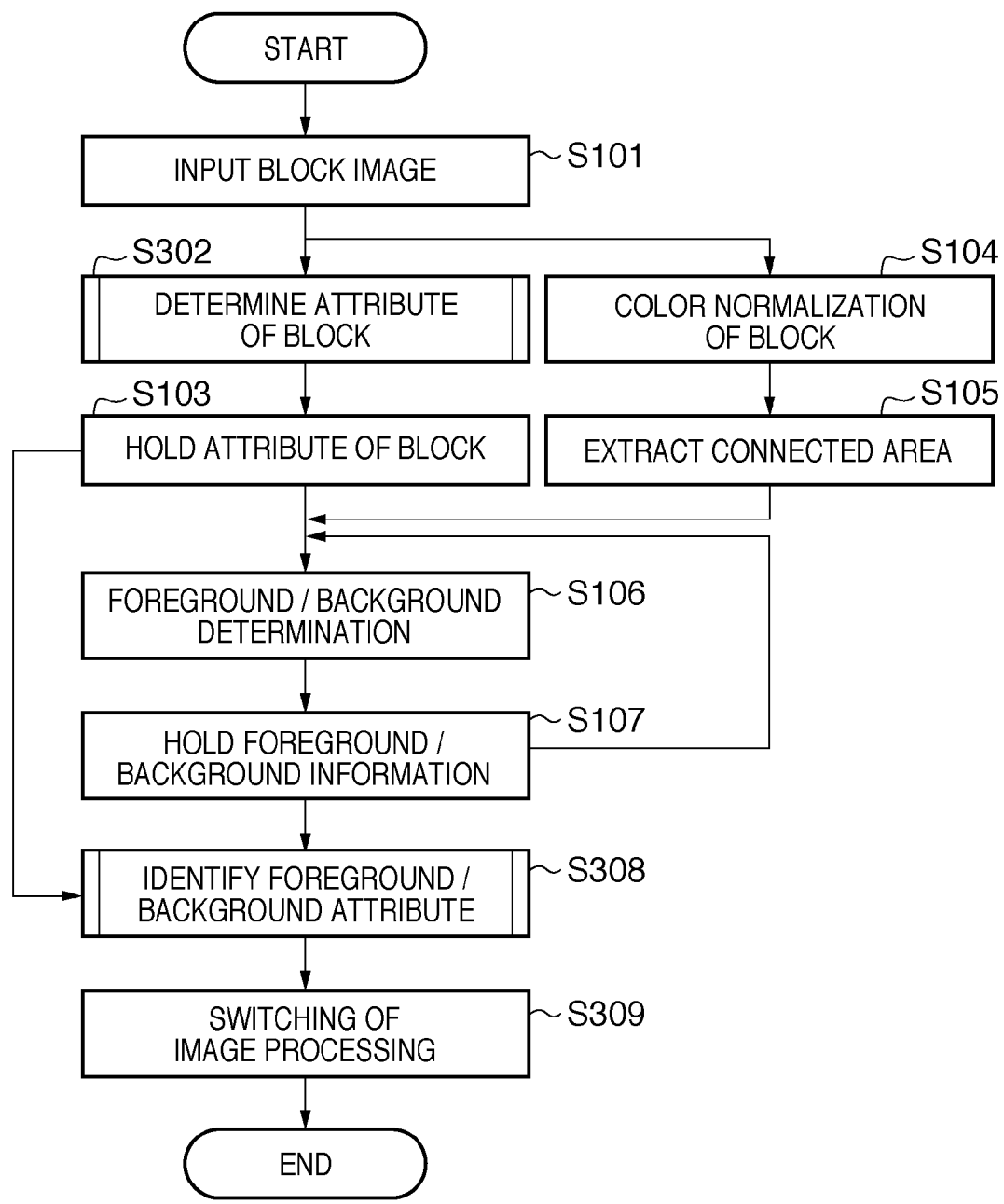
FIG. 12 is a flowchart illustrating the outline of foreground/background determination, foreground/background attribute identification, and switching of image processing according to the third embodiment.

FIG. 12 is a flowchart illustrating the outline of foreground/background determination, foreground/background attribute identification, and switching of image processing according to the present embodiment. In FIG. 12, the attribute determination processing of FIG. 3 for determining whether or not the block is a character area is replaced with attribute determination processing (step S302) for making a more detailed attribute classification, and foreground/background attribute identification (step S308) and switching of image processing (step S309) are added to the flowchart of FIG. 3.

Attribute Determination Processing (S302)

Figure 13:
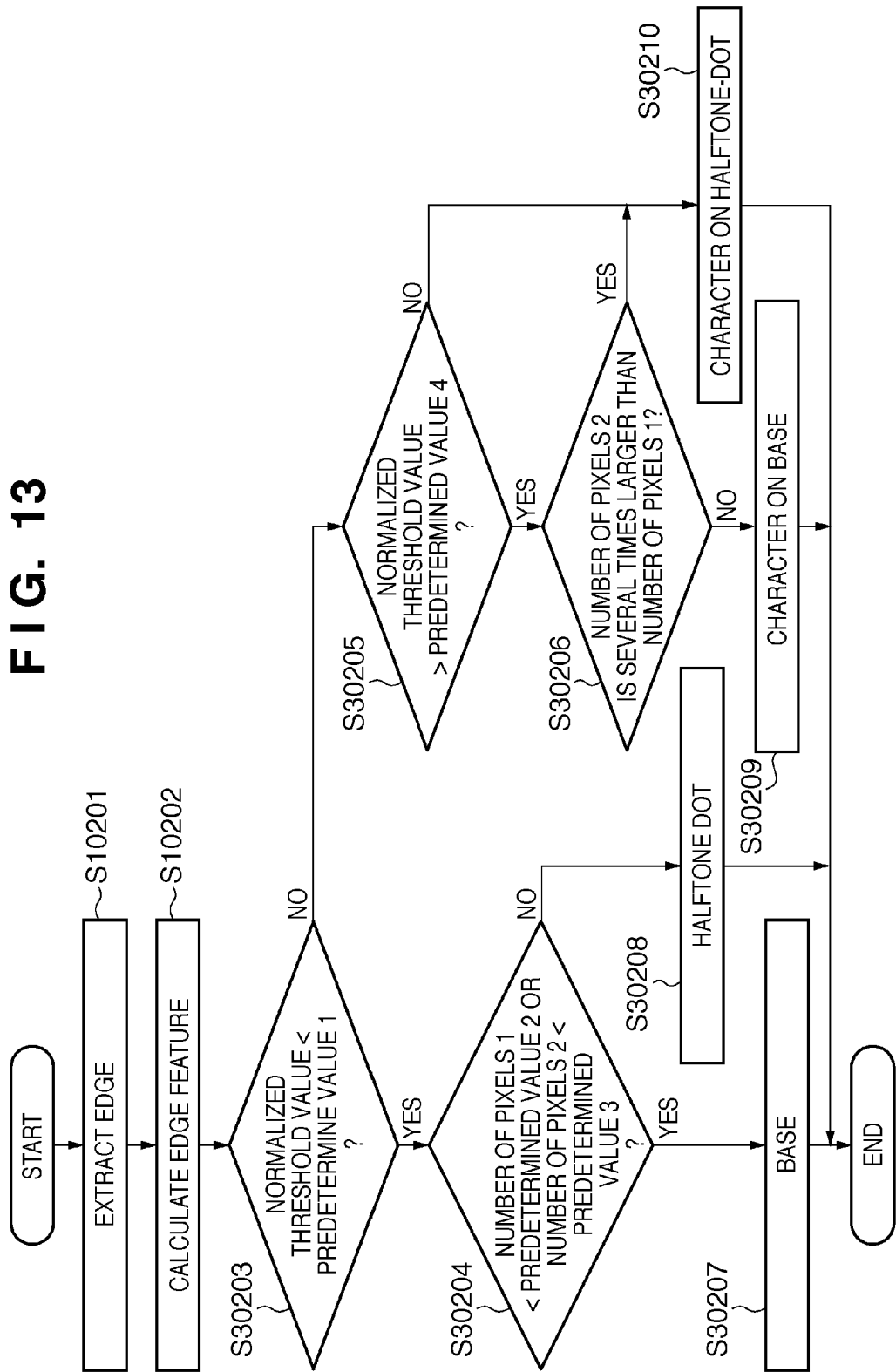
FIG. 13 is a flowchart of block attribute determination processing according to the third embodiment.

In attribute determination processing, it is determined whether the block is a base area, a halftone-dot area, a character on base area, or a character on halftone-dot area. The details of this block attribute determination processing (step S302) will be described with reference to FIG. 13. First, an edge is extracted from a processing target block in step S10201. Next, a normalized threshold value of the block, "the number of pixels 1", that have the edge intensity higher than or equal to the normalized threshold value, and "the number of pixels 2", that have the edge intensity higher than or equal to a preset fixed threshold value are calculated from the extracted edge in step S10202. Then, the attribute is determined through processing from steps S30203 to S30210. In step S30203, the normalized threshold value of the block is compared with a predetermined value 1, and if the normalized threshold value is less than the predetermined value 1, the block is determined as either a base area or a halftone-dot area, and the procedure proceeds to step S30204. On the other hand, if the normalized threshold value is greater than or equal to the predetermined value 1, the block is determined as either a character on base or a character on halftone dot, and the procedure proceeds to step S30205. Here, it is desirable that the predetermined value 1 be set to a low value (e.g., 250) among possible values that the normalized threshold value can take.

In step S30204, it is further determined whether the candidate is a base or a halftone dot, based on the number of pixels 1, that have high edge intensity relative to the normalized threshold value and the number of pixels 2, that have the edge intensity higher than or equal to the fixed threshold value. If either of the conditions that the number of pixels 1, is smaller than a predetermined value 2 and that the number of pixels 2, is smaller than a predetermined value 3 is satisfied, the procedure proceeds to step S30207, in which the attribute of the block is determined as a base. If none of the above-described conditions is satisfied, the procedure proceeds to step S30208, in which the attribute of the block is determined as a halftone dot. Here, the predetermined value 2 and the predetermined value 3 are set to low values (e.g., 30 and 50, respectively) among possible values that the number of pixels (the number of pixels of the block) can take.

If it has not been determined in step S30203 that the normalized threshold value is less than the predetermined value 1, the procedure proceeds to step S30205. Then, if the normalized threshold value is greater than a predetermined value 4, the procedure proceeds to step S30206. On the other hand, if the normalized threshold value is less than or equal to the predetermined value 4, the procedure proceeds to step S30210, in which the attribute of the block is determined as a character on halftone dot. If the number of pixels 2, is several times greater than the number of pixels 1, in step S30206, the procedure proceeds to step S30210, in which the attribute of the block is determined as a character on halftone dot. Otherwise, the procedure proceeds to step S30209, in which the attribute of the block is determined as a character on base. Here, it is desirable that the predetermined value 4 be set to a high value (e.g., 500) among possible values that the normalized threshold value can take. In addition, as a criterion used to compare the number of pixels 1, and the number of pixels 2, in step S30206, a corresponding value is assumed to be predefined. Such a predefined value may be obtained empirically or may be obtained based on arbitrary expressions.

Foreground/Background Attribute Identification Processing (S308)

This processing identifies the attribute of each foreground or background portion determined by the foreground/background determination processing based on the attribute of the block. If the processing target block is a base area, a connected area of the processing target block is identified as having a base attribute. If the processing target block is a halftone-dot area, a connected area of the processing target block is identified as having a halftone dot attribute. If the processing target block is a character on base area, each connected area determined as the foreground (character portion) is identified as a character on base area, and each connected area determined as the background is determined as a base area. If the processing target block is a character on halftone-dot area, each connected area determined as the foreground (character portion) is identified as a character on halftone-dot area, and each connected area determined as the background is determined as a halftone-dot area.

According to the present embodiment described above, switching image processing after determining the foreground and background of a block and identifying the attribute of the foreground and the background enables high quality image processing results to be obtained.

Fourth Embodiment

Figure 14:
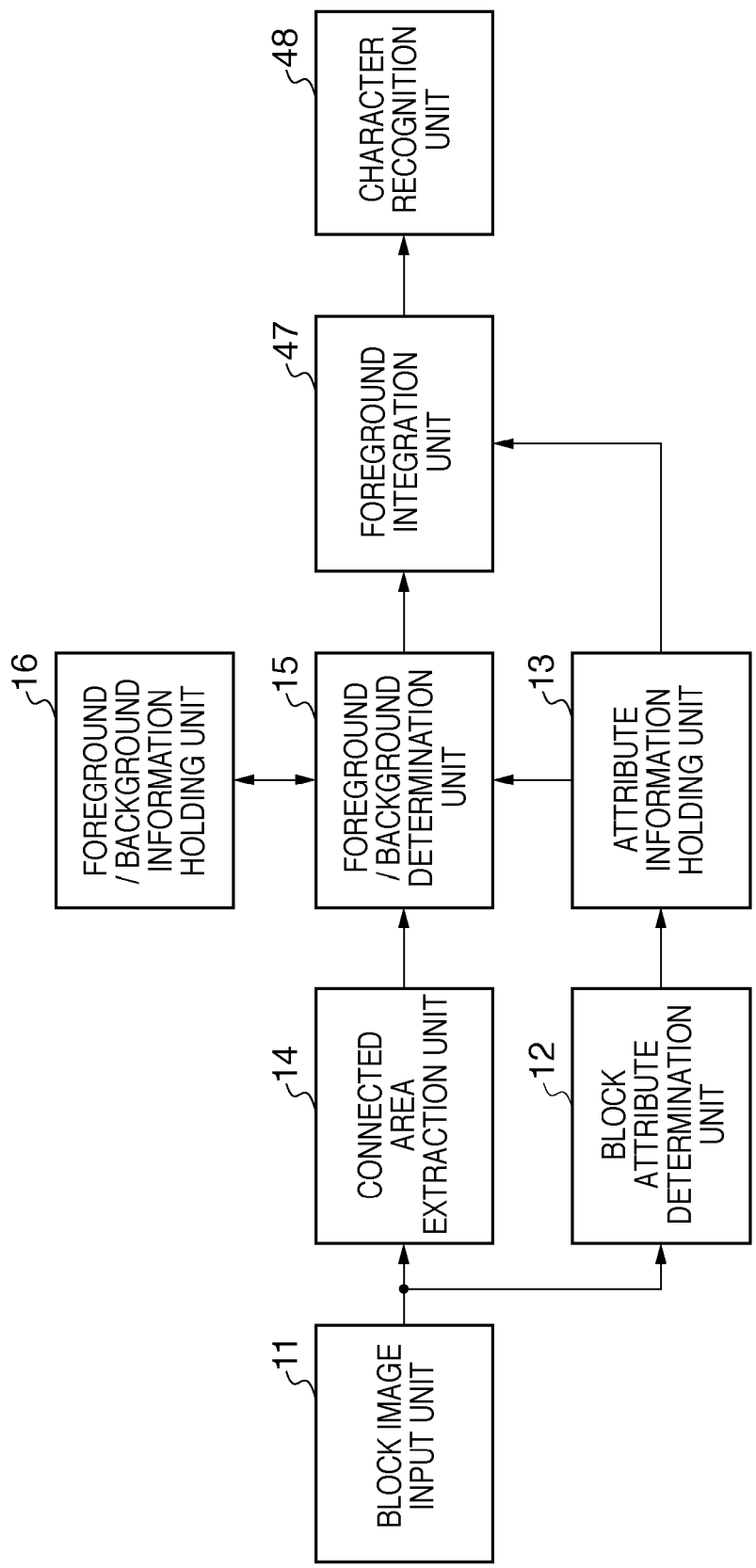
FIG. 14 is a block diagram showing a functional configuration of an image processing apparatus according to the fourth embodiment.
Figure 15:
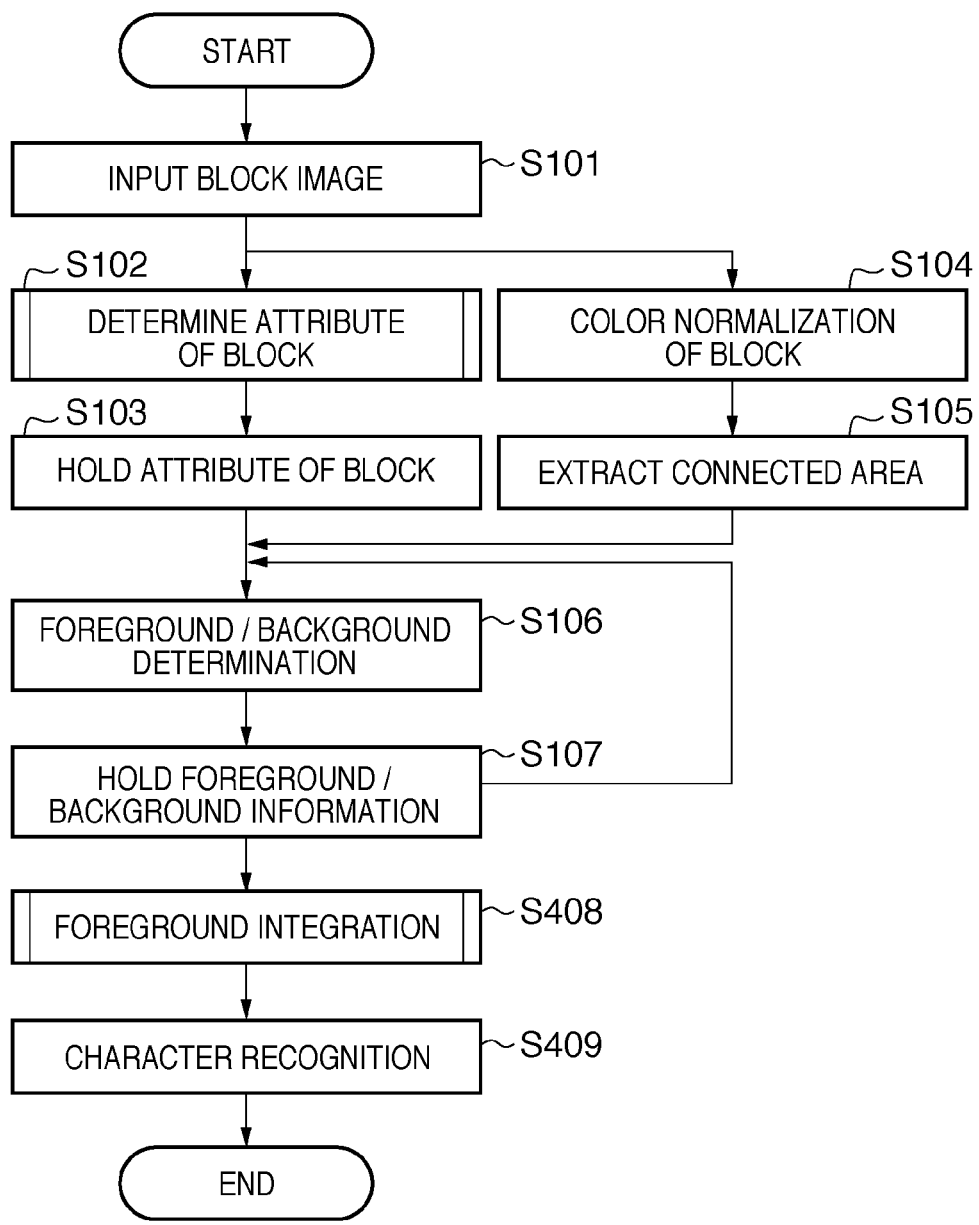
FIG. 15 is a flowchart of foreground/background determination, foreground integration, and character recognition according to the fourth embodiment.

The foreground/background determination processing has been described in the first and second embodiments. The present embodiment provides an application example of the foreground/background determination processing with addition of processing for integrating foreground portions of surrounding blocks and processing for character recognition. FIG. 14 is a block diagram showing a configuration of an image processing apparatus according to the present embodiment, in which a foreground integration unit 47 and a character recognition unit 48 are added to the configuration of FIG. 2. The foreground integration unit 47 integrates foreground portions determined by the foreground/background determination unit 15 by referencing information regarding surrounding blocks. The details of this foreground integration processing will be described later. The character recognition unit 48 cuts out characters from an integrated foreground portion and recognizes each character. Methods such as described in Japanese Patent Laid-Open No. 09-269970, for example, can be used as a technique for this character recognition. FIG. 15 is a flowchart illustrating the outline of foreground/background determination, foreground integration, and character recognition according to the present embodiment. In FIG. 15, foreground integration (step S408) and character recognition (step S409) are added to the flowchart of FIG. 3.

Foreground Integration (S408)

Foreground integration processing is performed based on a foreground portion of each block determined by the foreground/background determination processing and a connection relation of the foreground portion with surrounding blocks. In the case where a foreground portion of a processing target block abuts a foreground portion of either the right-side block or the lower-side block (second adjacent block), the foreground portions of those blocks are integrated and accordingly blocks including those foreground portions are also integrated. A new integrated block obtained thereby is used as a processing target block, and a block that is adjacent to the processing target block and abuts a foreground portion of the processing target block is further integrated therewith. Thereby, blocks are grouped together.

Example of Foreground Integration (S408)

Figure 9B:
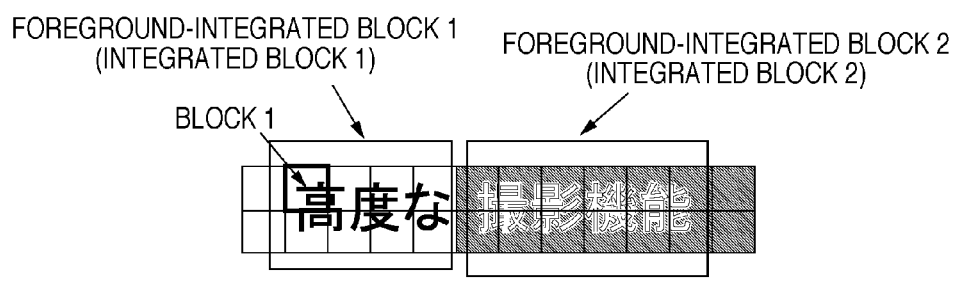

FIG. 9B is a diagram showing an example of such foreground integration processing. A character area in the example is subjected to foreground/background determination processing on a block-by-block basis, in which a block 1 is the one firstly subjected to foreground integration processing. By integrating the right-side block and the lower-side block (second adjacent blocks) that abut foreground portions of the block 1, a character portion (a total of eight blocks) of "高度な" (meaning "advanced") in Japanese characters forms an integrated group 1 of blocks. Similarly, a character portion of "撮影機能" (meaning "photography functions") in Japanese characters forms an integrated group 2 of blocks. Such integrated blocks (integrated groups 1 and 2) are recognized after cut into characters. In character recognition processing, for example, the character portion of "高度な" is recognized after cut into three Japanese characters "高", "度", and "な".

According to the embodiment described above, determining the foreground and the background with high precision and integrating foreground portions based on the connection of the foreground portions with surrounding blocks enables provision of information required for character recognition and accordingly enables high-precision character recognition.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298822, filed Dec. 28, 2009, which is hereby incorporated by reference herein in its entirety.

What is claimed is:

1. An image processing apparatus comprising:
an attribute determination unit that divides image data into a plurality of blocks each having a predetermined number of pixels and determines an attribute of each of the divided blocks that indicates whether or not the block includes a character;
a connected area extraction unit that extracts a connected area in which pixels having the same pixel characteristic are connected sequentially, from each of the divided blocks; and
a foreground/background determination unit that selects a foreground/background determination method to be used for a processing target block, based on the attribute of the processing target block, the attribute of a first adjacent block that is adjacent to the processing target block, and the extracted connected areas, and determines whether a connected area of the processing target block among the extracted connected areas is the foreground or the background, using the selected foreground/background determination method.

2. The image processing apparatus according to claim 1, wherein the foreground/background determination unit makes a determination such that:
in a case (i) where the attribute of the processing target block is a non-character attribute, the processing target block is determined as the background;
in a case (ii) where the attribute of the processing target block is a character attribute, and the attribute of the first adjacent block is the character attribute, and a foreground connected area of the first adjacent block is present on a boundary between the processing target block and the first adjacent block, each connected area of the processing target block is determined as either the foreground or the background based on a connection relation between the foreground connected area of the first adjacent block and the connected area of the processing target block;
in a case (iii) where the attribute of the processing target block is the character attribute, and the attribute of the first adjacent block is the character attribute, and no foreground connected area of the first adjacent block is present on the boundary, and a surrounding relation is established between connected areas of the processing target block, or in a case (iv) where the attribute of the processing target block is the character attribute, and the attribute of the first adjacent block is the non-character attribute, and a surrounding relation is established between connected areas of the processing target block, each connected area of the processing target block is determined as either the foreground or the background based on the surrounding relation;
in a case (v) where the attribute of the processing target block is the character attribute, and the attribute of the first adjacent block is the character attribute, and no foreground connected area of the first adjacent block is present on the boundary, and no surrounding relation is established between connected areas of the processing target block, or in a case where (vi) the attribute of the processing target block is the character attribute, and the attribute of the first adjacent block is the non-character attribute, and no surrounding relation is established between connected areas of the processing target block, each connected area of the processing target block is determined as either the foreground or the background based on similarity in color between a background connected area of the first adjacent block and the connected area of the processing target block.

3. The image processing apparatus according to claim 2, wherein, in the case (ii), the foreground/background determination unit determines that a color of a connected area of the processing target block that is connected to the foreground connected area of the first adjacent block that is present on the boundary is a foreground color, a connected area of the processing target block that has the same color as the foreground color is the foreground, and a connected area of the processing target block that has a color different from the foreground color is the background.

4. The image processing apparatus according to claim 2, wherein, in the case (iii) or the case (iv), the foreground/background determination unit determines that a color of a connected area of the processing target block that surrounds another connected area is a background color, a connected area of the processing target block that has a color different from the background color is the foreground, and a connected area of the processing target block that has the same color as the background color is the background.

5. The image processing apparatus according to claim 2, wherein, in the case (v) or the case (vi), the foreground/background determination unit determines that a connected area of the processing target block, that has a color similar to a color of a connected area of the first adjacent block determined as the background, is the background, and a connected area of the processing target block, that has a color dissimilar to the color of the connected area of the first adjacent block determined as the background, is the foreground.

6. The image processing apparatus according to claim 1, wherein the first adjacent block is a left-side block or an upper-side block of the processing target block.

7. The image processing apparatus according to claim 1, wherein the foreground/background determination unit further comprises an information holding unit that holds information as to determination results indicating whether each connected area of the processing target block is the foreground or the background.

8. The image processing apparatus according to claim 7, wherein
- if the attribute of the processing target block is the non-character attribute and the processing target block is constituted by a connected area having a single color, the information holding unit holds the single color as a background color, and
- if the attribute of the processing target block is the non-character attribute and the processing target block is constituted by a connected area having two colors, the information holding unit holds, as the background color, one of the two colors that abuts a second adjacent block at the boundary.

9. The image processing apparatus according to claim 8, wherein the second adjacent block is either a right-side block or a lower-side block of the processing target block.

10. The image processing apparatus according to claim 1, wherein
- the attribute determined by the attribute determination unit is one of a character on base area, a character on halftone-dot area, a base area, and a halftone dot area, the character on base area and the character on halftone-dot area being the character attribute, and the base area and the halftone-dot area being the non-character attribute, the image processing apparatus further comprising:
- an attribute identification unit that identifies the attribute of each connected area extracted from the processing target block as one of a base area, a halftone-dot area, a character on base area, and a character on halftone-dot area, based on the attribute of the processing target block determined by the attribute determination unit and a determination result obtained by the foreground/background determination unit and indicating whether the connected area is the foreground or the background.

11. The image processing apparatus according to claim 1, further comprising a foreground integration unit that integrates a connected area of the processing target block determined as the foreground with a connected area of an adjacent block determined as the foreground, when the connected area of the processing target block determined as the foreground abuts the connected area of the adjacent block determined as the foreground.

12. An image processing method comprising:
- an attribute determination step of dividing image data into a plurality of blocks each having a predetermined number of pixels, and determining an attribute of each of the divided blocks that indicates whether or not the block includes a character;
- a connected area extraction step of extracting a connected area in which pixels having the same pixel characteristic are connected sequentially, from each of the divided blocks; and
- a foreground/background determination step of selecting a foreground/background determination method to be used for a processing target block, based on the attribute of the processing target block, the attribute of a first adjacent block that is adjacent to the processing target block, and the extracted connected areas and determining whether a connected area of the processing target block among the extracted connected areas is a foreground or a background, using the selected foreground/background determination method.

13. A non-transitory computer-readable medium storing a program which, when executed by a computer, causes the computer to perform the image processing method according to claim 12.

* * * * *